(12) United States Patent
Cairns et al.

(10) Patent No.: US 7,539,240 B2
(45) Date of Patent: May 26, 2009

(54) METHOD AND APPARATUS FOR PARAMETER ESTIMATION IN A GENERALIZED RAKE RECEIVER

(75) Inventors: Douglas A. Cairns, Durham, NC (US);
Gregory E. Bottomley, Cary, NC (US);
Yi-Pin Eric Wang, Cary, NC (US);
Tracy L. Fulghum, Durham, NC (US);
Elias Jonsson, Malmö (SE)

(73) Assignee: Telefonaftiebolaget LM Ericsson (publ), Stockholm (SE)

( * ) Notice: Subject to any disclaimer, the term of this patent is extended or adjusted under 35 U.S.C. 154(b) by 694 days.

(21) Appl. No.: 10/800,167

(22) Filed: Mar. 12, 2004

(65) Prior Publication Data

US 2005/0201447 A1  Sep. 15, 2005

(51) Int. Cl.
*H04B 15/00* (2006.01)
(52) U.S. Cl. .................. 375/152; 375/343; 375/150
(58) Field of Classification Search .......... 375/130, 375/140, 147, 316, 343, 346, 347, 348, 150, 375/151, 152
See application file for complete search history.

(56) References Cited

U.S. PATENT DOCUMENTS

| | | | |
|---|---|---|---|
| 5,572,552 A | 11/1996 | Dent et al. | |
| 5,809,020 A | 9/1998 | Bruckert et al. | |
| 6,101,399 A | 8/2000 | Raleigh et al. | |
| 6,363,104 B1 | 3/2002 | Bottomley | |
| 6,470,044 B1 | 10/2002 | Kowalski | |
| 6,529,545 B2 | 3/2003 | Tiirola et al. | |
| 6,683,924 B1 | 1/2004 | Ottosson et al. | |
| 6,714,585 B1 * | 3/2004 | Wang et al. | 375/148 |
| 6,771,690 B2 * | 8/2004 | Heikkila | 375/147 |
| 6,985,518 B2 * | 1/2006 | Nielsen | 375/152 |

(Continued)

FOREIGN PATENT DOCUMENTS

EP    1 300 999    4/2003

(Continued)

OTHER PUBLICATIONS

Kutz, et al.; On the Performance of a Practical Downlink CDMA Generalized RAKE Receiver; 2002 IEEE; 5 pgs.

(Continued)

*Primary Examiner*—Chieh M Fan
*Assistant Examiner*—Aristocratis Fotakis
(74) *Attorney, Agent, or Firm*—Coats & Bennett, P.L.L.C.

(57) ABSTRACT

Exemplary received signal processing may be based on maintaining a model of received signal impairment correlations, wherein each term of the model is updated periodically or as needed based on measuring impairments for a received signal of interest. An exemplary model comprises an interference impairment term scaled by a first model fitting parameter, and a noise impairment term scaled by a second model fitting parameters. The model terms may be maintained based on current channel estimates and delay information and may be fitted to measured impairment by adapting the model fitting parameters based on the measured impairment. The modeled received signal impairment correlations may be used to compute RAKE combining weights for received signal processing, or to compute Signal-to-Interference (SIR) estimates. Combined or separate models may be used for multiple received signals. As such, the exemplary modeling is extended to soft handoff, multiple antennas, and other diversity situations.

59 Claims, 5 Drawing Sheets

U.S. PATENT DOCUMENTS

| | | | |
|---|---|---|---|
| 7,092,452 B2 * | 8/2006 | Taylor et al. | 375/267 |
| 7,161,973 B2 * | 1/2007 | Ghosh | 375/147 |
| 7,167,723 B2 * | 1/2007 | Zhang | 455/554.2 |
| 2001/0028677 A1 * | 10/2001 | Wang et al. | 375/148 |
| 2002/0057735 A1 | 5/2002 | Piirainen | |
| 2002/0080863 A1 | 6/2002 | Nielsen | |
| 2002/0122470 A1 | 9/2002 | Heikkila | |
| 2002/0141486 A1 * | 10/2002 | Bottomley et al. | 375/148 |
| 2002/0150176 A1 | 10/2002 | Chevalier et al. | |
| 2003/0031234 A1 * | 2/2003 | Smee et al. | 375/147 |
| 2003/0035468 A1 | 2/2003 | Corbaton et al. | |
| 2004/0146094 A1 * | 7/2004 | Kong et al. | 375/148 |
| 2004/0228420 A1 * | 11/2004 | Chul | 375/267 |
| 2004/0253955 A1 * | 12/2004 | Love et al. | 455/442 |
| 2005/0136840 A1 * | 6/2005 | Molnar et al. | 455/63.1 |
| 2005/0201447 A1 | 9/2005 | Cairns et al. | |
| 2006/0007990 A1 | 1/2006 | Cozzo et al. | |
| 2006/0182204 A1 | 8/2006 | Cairns et al. | |

FOREIGN PATENT DOCUMENTS

| | | |
|---|---|---|
| EP | 1392000 A1 | 2/2004 |
| WO | WO 01/01595 | 1/2001 |

OTHER PUBLICATIONS

Kutz, et al.; Low Complexity Implementation of a Downlink CDMA Generalized RAKE Receiver; 2002 IEEE; 5 pgs.

Response to Novelty Search for "Parameter Estimation in a Generalized RAKE Receiver"; 16 pgs.

Bottomley et al.; A Generalized RAKE Receiver for Interference Suppression; IEEE Journal on Selected Areas in Communications; vol. 18, No. 8, Aug. 2000; 10 pgs.

Tantikovit et al., "Joint Multipath Diversity Combining and MLSE Equalization (Rake-MLSE Receiver) for WCDMA Systems," 51st IEEE Vehicular Technology Conference Proceedings, May 15, 2000, pp. 435-439, vol. 1 of 3.

Tantikovit et al., "On Combining Schemes for W-CDMA RAKE Reception in the Presence of Interpath Interference," 3rd IEEE Signal Processing Workshop on Signal Processing Advances in Wireless Communications, Mar. 20, 2001, pp. 5-8.

Tantikovit et al., "A Unified View of RAKE Reception and Its Application on Receiver Designs for Multimedia Capable Mobile Terminals in W-CDMA," IEICE Trans. Commun., Oct. 2002, pp. 1944-1*56, vol. E85-B, No. 10.

Cairns, D. et. al., "Low Complexity Parameter Estimation For The Generalized Rake Receiver." 2004 IEEE 11th Digital Signal Processing Workshop & IEEE Signal Processing Education Workshop. Aug. 1-4, 2004. pp. 191-195.

Bottomley, G. et. al., "A Generalized Rake Receiver For DS-CDMA Systems." 2000 IEEE 51st Vehicular Technology Conference Proceedings on May 15-18, 2000 in Tokyo, Japan and New York, New York. May 15, 2000. pp. 941-945. vol. 2 of 3.

Wang, Yi-Pin and Bottomley, G., "Generalized RAKE Reception for Canceling Interference from Multiple Base Stations." 2000 Vehicular Technology Conference on Sep. 24-28, 2000 in Piscataway, New Jersey. Sep. 24, 2000. pp. 2333-2339. vol. 5.

Lenardi, M. and Slock, D., "A RAKE Structured SINR Maximizing Mobile Receiver for the WCDMA Downlink." In Proc. 31st Asilomar Conference on Signals, Systems and Computers, 2001, pp. 410-414.

Jarosch, A. and Dahlhaus, D., "Linear Space-Time Diversity Receivers for the Downlink of UMTS with WCDMA." European Trans. Telecommunications, Sep./Oct. 2001, 13 pages, vol. 12, No. 5. (Preprint Copy Enclosed and Available at http://www.nari.ee.ethz.ch/mobileradio/pubs/files/ett01.pdf.

Grant, Stephan J., et. al., "Generalized RAKE Receivers for MIMO Systems." IEEE Vehicular Technology Conference, Oct. 6-9, 2003, pp. 424-428.

Fulghum, Tracy, et. al., "Low Complexity Parameter Estimation for the Multi-antenna Generalized Rake Receiver." IEEE 63rd Vehicular Technology Conference, Spring 2006, pp. 1874-1878.

Co-pending U.S. Appl. No. 11/470,676 filed Sep. 7, 2006.
Co-pending U.S. Appl. No. 11/550,901 filed Oct. 19, 2006.
Co-pending U.S. Appl. No. 11/538,074 filed Oct. 3, 2006.
Co-pending U.S. Appl. No. 11/566,820 filed Dec. 5, 2006.
Co-pending U.S. Appl. No. 11/751,109 filed May 21, 2007.
Co-pending U.S. Appl. No. 11/681,302 filed Mar. 2, 2007.
Co-pending U.S. Appl. No. 11/935,840 filed Nov. 7, 2007.

* cited by examiner

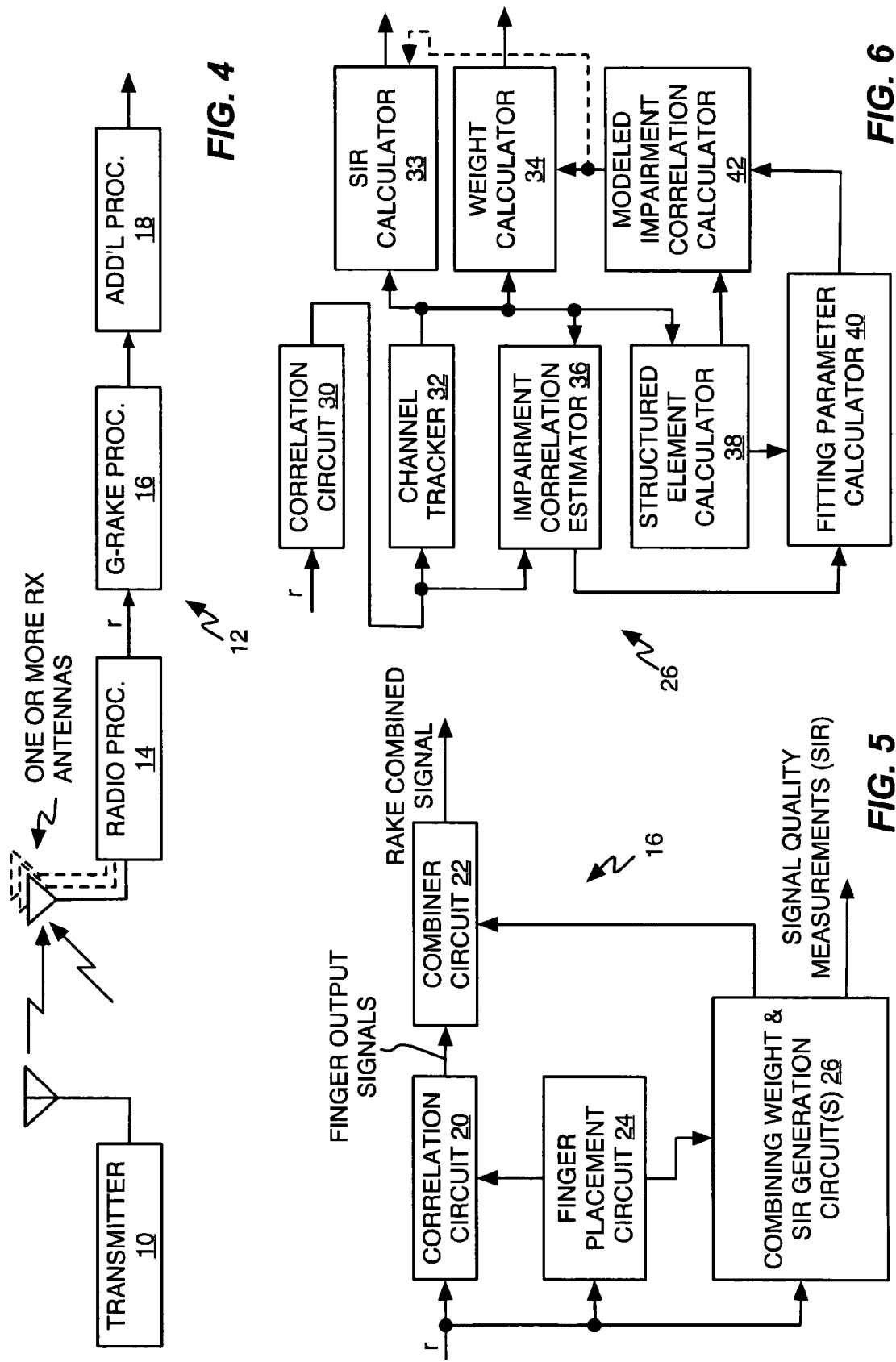

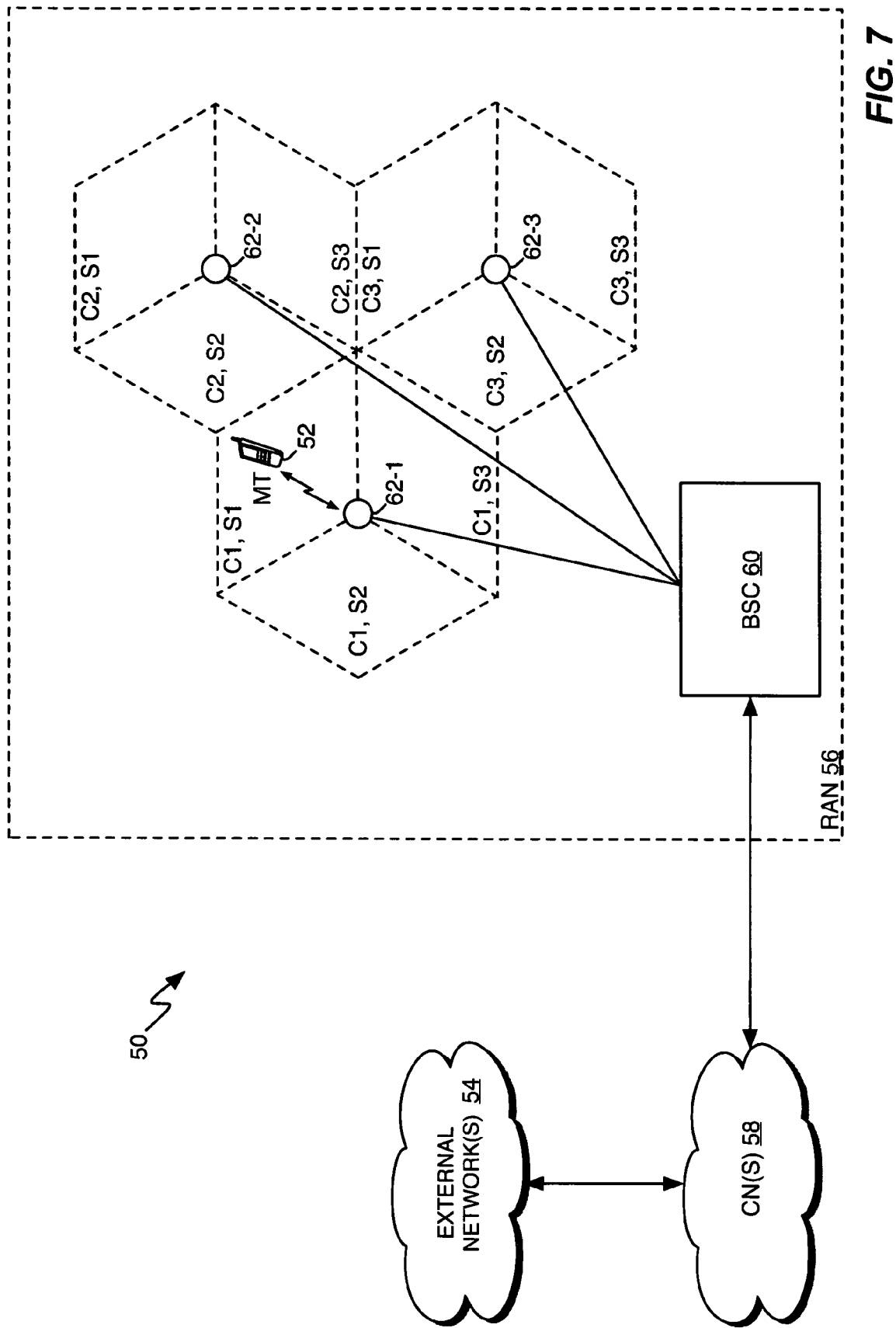

METHOD AND APPARATUS FOR PARAMETER ESTIMATION IN A GENERALIZED RAKE RECEIVER

BACKGROUND OF THE INVENTION

The present invention generally relates to wireless communication services, and particularly relates to tracking signal impairment correlations of received communication signals.

RAKE receivers are well known in the communication arts and find widespread use in Code Division Multiple Access (CDMA) systems, such as in IS-95, IS-2000 (cdma2000), and Wideband CDMA (WCDMA) wireless communication networks. The name derives from the rake-like appearance of such receivers, wherein multiple, parallel receiver fingers are used to receive multiple signal images in a received multipath signal. By coherently combining the finger outputs in a RAKE combiner, the conventional RAKE receiver can use multipath reception to improve the Signal-to-Noise Ratio (SNR) of the received multipath signal.

However, as is known to those skilled in the art, the conventional RAKE receiver is optimal only in certain limited circumstances. For example, the presence of self-interference and multi-user access interference both degrade the performance of a conventional RAKE receiver. To that end, the assignee of the instant application has made application for one or more patents relating to the use of a "generalized" RAKE receiver architecture, wherein receiver performance is improved by increasing the sophistication of combining weight generation.

Thus, in the generalized RAKE architecture, the combining weight calculations consider correlations of one or more signal impairments across RAKE fingers. For example, a generalized RAKE receiver may track noise correlations across those fingers. Generalized RAKE receivers also may include a comparatively larger number of fingers such that extra fingers may be positioned off of the signal path delays. Indeed, a generalized RAKE receiver can gain performance improvements by shifting these extra fingers to optimize the SNR of the received signal. Correlations of signal impairments can also be used in SNR estimating often referred to as signal to interference ratio (SIR) estimation. SIR estimation is used in power control as well as in monitoring link quality and rate adaptation.

Regardless, by using its knowledge of how selected signal impairments are correlated across fingers, the generalized RAKE receiver can compensate the finger combining weights such that receiver performance is improved. Of course, the need to determine signal impairment correlations with sufficient accuracy and rapidity stands as a primary challenge associated with implementation of the generalized RAKE receiver.

SUMMARY OF THE INVENTION

The present invention provides a method and apparatus to estimate signal impairment correlations for one or more received signals of interest using a model-based technique wherein the model is adapted responsive to recurring measurements of signal impairment correlations that can be made on a frequent basis, e.g., every timeslot of a Wideband CDMA (WCDMA) frame, thereby dynamically tracking even rapidly changing signal impairment correlations. In one or more exemplary embodiments, the present invention thus comprises a method of determining received signal impairment correlations for use in generating RAKE combining weights and/or SIR estimates, wherein the method comprises providing a model of received signal impairment correlations comprising one or more impairment terms scaled by corresponding model fitting parameters, and adapting each of the model fitting parameters responsive to recurring measurements of the received signal impairment correlations such that the model of received signal impairment correlations dynamically tracks changing reception conditions.

In at least one embodiment, an exemplary method comprises providing an interference impairment term scaled by a first fitting parameter and a noise impairment term scaled by a second fitting parameter to model received signal impairment correlations, measuring received signal impairment correlations at each of one or more successive time instants and, at each time instant, fitting the model to measured received signal impairment correlations by adapting instantaneous values of the first and second fitting parameters, and maintaining the model by updating the first and second fitting parameters based on the instantaneous values calculated for them at each time instant.

Embodying one or more of these exemplary methods, an exemplary wireless communication terminal for use in a wireless communication network comprises a radio front-end circuit, e.g., a radio processor, configured to provide one or more received signals of interest corresponding to one or more antenna-received signals, and a RAKE receiver circuit configured to generate one or more RAKE combined signals by RAKE processing the one or more received signals of interest. An exemplary RAKE receiver circuit is configured to calculate RAKE combining weights and SIR estimates by providing a model of received signal impairment correlations for a received signal of interest comprising an interference impairment term scaled by a first fitting parameter and a noise impairment term scaled by a second fitting parameter, measuring received signal impairment correlations at each of one or more successive time instants and, at each time instant, fitting the model to measured received signal impairment correlations by adapting instantaneous values of the first and second fitting parameters, and maintaining the model by updating the first and second fitting parameters based on the instantaneous values calculated for them at each time instant.

Of course, the present invention includes additional features and advantages as highlighted in the following detailed discussion. Those skilled in the art will recognize additional features and advantages upon reading that discussion, and upon viewing the accompanying drawings.

BRIEF DESCRIPTION OF THE DRAWINGS

FIG. 4 is a diagram of a simplified transmitter and receiver, wherein the receiver includes a generalized RAKE receiver circuit according to one or more embodiments of the present invention.

FIG. 5 is a diagram of the generalized RAKE receiver circuit of FIG. 4.

FIG. 6 is a diagram of an exemplary combining weight and SIR generator included in the circuit of FIG. 5.

FIG. 7 is a diagram of an exemplary wireless communication network, in which a mobile terminal includes a receiver circuit configured according to the present invention.

DETAILED DESCRIPTION OF THE INVENTION

In accordance with one or more exemplary embodiments of the present invention, a receiver, such as the receiver circuit of a mobile terminal for use in a wireless communication network, includes a generalized RAKE receiver circuit that generates RAKE combining weights and SIR estimates based on modeled received signal impairment correlations. As is known in the RAKE receiver arts, the output signals obtained from the individual RAKE fingers can include cross-correlated "impairments." As used herein, the term "impairment" has a broad definition that includes, but is not limited to, one or more of the following items: self and multi-user interference and noise. For additional background regarding exemplary generalized RAKE operations, one may refer to the co-pending and commonly assigned U.S. patent application assigned Ser. No. 09/344,899, which is incorporated herein by reference.

Figure 1:
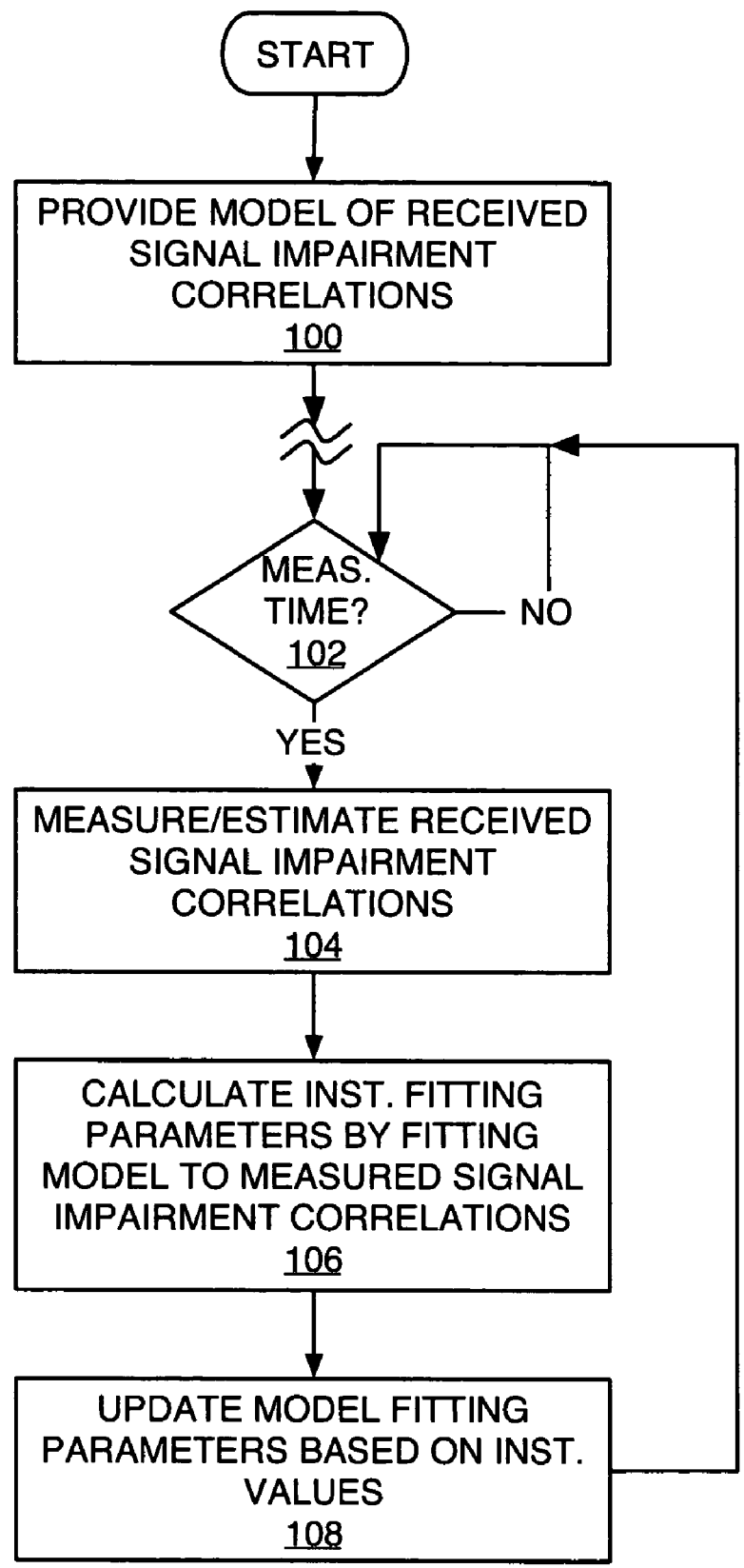
FIG. 1 is a diagram of an exemplary method of modeling received signal impairment correlations according to the present invention.

In the generalized RAKE architecture, denoted as "G-RAKE" herein, the combining weights used to combine the RAKE finger outputs are compensated for cross-finger correlations in one or more of these impairment terms, and the present invention provides a method and apparatus for carrying out such compensation using a model-based approach. FIG. 1 broadly outlines an exemplary method to implement the present invention's model-based method of impairment correlation estimations. In the context of FIG. 1, the exemplary model comprises one or more impairment terms, which may comprise structured elements, e.g., particularly defined matrices, with each term being scaled by a model fitting parameter. This model structure is explored in much greater detail later herein.

In examining the illustrated processing logic, one sees that processing "begins" with providing a model of received signal impairment correlations (Step 100). Those skilled in the art will appreciate that "providing" in this context may comprise configuring a Digital Signal Processor (DSP), microprocessor, or other processing logic, to implement an impairment correlation model according to stored computer instructions. With the model available, the exemplary receiver estimates impairment correlations from received signal measurements at successive instants in time, and then updates the model based on these measurements. In this sense, then, the present invention provides an adaptive modeling method that "learns" impairment correlations directly from received signal measurements.

Thus, if it is time to make such measurements and update the model (Step 102), the exemplary receiver logic measures received signal impairment correlations—at least for the impairment terms of interest—(Step 104), and calculates instantaneous values for the model's fitting parameters (Step 106). These instantaneous values are then used to update the model's fitting parameters, such that the model of received signal impairment correlations tracks changing reception conditions (Step 108).

Turning to exemplary model details, the impairment correlation matrix R of a received signal for a mobile terminal receiving CDMA signal transmissions from a radio base station can be expressed as a function of certain parameters based on the theoretical expression given as, $$R = \frac{C}{N}\frac{E_t}{E_p}R_I + N_0 R_n, \quad (1)$$

where $E_p$ is the pilot energy per unit time, $E_t$ is the total base station energy per unit time, N is the spreading factor, C is a scaling factor, $N_0$ is the noise factor, $R_I$ is an interference correlation matrix, and $R_n$ is a thermal noise correlation matrix arising from the autocorrelation properties of receiver filtering. Note that $R_I$ may be constructed as an interference covariance matrix and $R_n$ may be constructed as a noise correlation matrix. The terms "covariance" and "correlation" as used herein should be understood as interchangeable unless the context of a particular passage makes an explicit distinction between the two terms. Those skilled in the art will, of course, appreciate that covariance is a special case of cross-correlation with zero mean.

In looking at Eq. (1) above, it should be noted that a receiver generally cannot know $E_t/E_p$ and $N_0$ explicitly. One or more exemplary embodiments of the present invention obviates this problem by determining the model's impairment terms ($R_I$ and $R_n$) explicitly using channel coefficient and receiver pulse shape information. Those skilled in the art will appreciate that a given receiver can be configured with knowledge of its receiver filter pulse shape, e.g., its filter autocorrelation function, and can maintain channel coefficient estimates based on receiving pilot symbols, training data, or other signal known a priori to the receiver such that reception of the known signal can be used to characterize the propagation channels. Exemplary formulas are given herein for computing $R_I$ and $R_n$ in terms of channel coefficient and pulse shape information. Thus, the present invention provides an impairment correlation model that, in an exemplary embodiment, comprises an interference term that is scaled by a first model fitting parameter, and a noise term that is scaled by a second model fitting parameter. Using this method, the impairment correlations, R, can be modeled as, $$R = \alpha R_I + \beta R_n \quad (2)$$

where $$R_I(d_1, d_2) = \qquad (3)$$

$$\sum_{l=0}^{L-1}\sum_{q=0}^{L-1} g_l g_q^* \sum_{m=-\infty, m\neq 0}^{m=\infty} R_p(d_1 - mT_c - \tau_l) R_p^*(d_2 - mT_c - \tau_q),$$

$$R_n(d_1, d_2) = R_p(d_1 - d_2)$$

and where $$g(\tau) = \sum_{l=0}^{L-1} g_l \delta(\tau - \tau_l)$$

(complex channel model, pilot channel), $R_p(\tau)$ is a pulse shape autocorrelation function, $T_c$ is a CDMA chip period, and $d_k$ is the delay of the kth G-RAKE finger. Note that the g values are channel coefficients corresponding to the pilot channel, i.e., channel coefficients estimated directly from a received pilot channel signal.

An exemplary model-based impairment estimation method based on the above equations comprises a couple of basic steps. First, the impairment model is adapted based on received signal impairment correlations estimated from measurements taken at successive time instants. At each time instant, the method provides an instantaneous estimate of the fitting parameters α and β, while a second step may or may not smooth the estimates to eliminate estimation noise and provide better receiver performance.

An exemplary method according to the above information is performed at each of a number of repeating time intervals, e.g., slots, and comprises:

a. Measure impairment correlations for the received signal in the current slot, i.e., determine a rough estimate of impairment correlations expressed as matrix $\hat{R}(slot)$;

b. Calculate per-slot model terms $R_I(slot)$ and $R_n(slot)$;

c. Determine instantaneous model fitting parameters $\alpha_{inst}$ and $\beta_{inst}$ for the slot based on performing a Least Squares fit of, $$\hat{R}(slot) = \alpha_{inst} R_I(slot) + \beta_{inst} R_n(slot); \quad (4)$$

d. Update the model fitting parameters $\alpha$ and $\beta$ based on the instantaneous fitting parameters, e.g., update filtered values of $\alpha$ and $\beta$ using $\alpha_{inst}$ and $\beta_{inst}$; and e. Calculate the modeled impairment correlations $\tilde{R}(slot)$ to be used in generating RAKE combining weights and an SIR estimate for the current slot as, $$\tilde{R}(slot) = \alpha R_I(slot) + \beta R_n(slot). \quad (5)$$

Note that $R_n$ (slot) may be denoted simply as $R_n$ since the thermal noise characteristics typically do not change significantly from slot to slot and thus can be updated more slowly. Also, it should be appreciated by those skilled in the art that the term slot is given broad construction herein, and can denote any time period, such as a regularly repeating frame time in a wireless communication signal. Still further, those skilled in the art will appreciate that parameter updating may be performed at irregular intervals and/or as needed, such as in response to the SNR after combining falling below a defined threshold.

According to the above exemplary method, the first step in the model-based impairment correlation estimation process is based on generating a rough—e.g., potentially noisy—estimate of received signal impairment correlations based on measurements of the received signal. Thus, the exemplary receiver is configured to generate measurements of the impairment correlation matrix on a short-term basis (every slot, every other slot, etc.). Given this measurement, knowledge of the channel (coefficients $g_l$ and delays $\tau_l$), and the RAKE finger delays d, every quantity in Eq. (4) is known except for $\alpha_{inst}$ and $\beta_{inst}$. One can isolate these unknowns by rewriting Eq. (4) in an equivalent form based on stacking of the columns of $\hat{R}$, $R_I$ and $R_n$, which yields, $$\begin{bmatrix} \hat{r}_1 \\ \hat{r}_2 \\ \vdots \\ \hat{r}_K \end{bmatrix} = \begin{bmatrix} r_{I,1} & r_{n,1} \\ r_{I,2} & r_{n,2} \\ \vdots & \vdots \\ r_{I,K} & r_{n,K} \end{bmatrix} \begin{bmatrix} \alpha_{inst} \\ \beta_{inst} \end{bmatrix} \quad (6)$$

where $\hat{r}_i = i^{th}$ column of measured impairment correlation matrix $\hat{R}$, $r_{I,i} = i^{th}$ column of interference correlation matrix $R_I$, and $r_{n,i} = i^{th}$ column of thermal noise correlation matrix $R_n$. (With zero means, the correlation matrices may be understood to be covariance matrices.)

As specified above, this system of equations can be solved via least squares. An exemplary least squares solution is given as, $$\begin{bmatrix} \alpha_{inst} \\ \beta_{inst} \end{bmatrix} = (A^H A)^{-1} A^H p, \text{ where} \quad (7)$$

$$A = \begin{bmatrix} r_{I,1} & r_{n,1} \\ r_{I,2} & r_{n,2} \\ \vdots & \vdots \\ r_{I,K} & r_{n,K} \end{bmatrix}, \text{ and where} \quad (8)$$

$$p = \begin{bmatrix} \hat{r}_1 \\ \hat{r}_2 \\ \vdots \\ \hat{r}_K \end{bmatrix}. \quad (9)$$

Note that this least square fitting need not be applied to all elements in the measured impairment correlation matrix $\hat{R}$. For example, only the diagonal elements and the first off-diagonal elements could be used to perform the fitting operation. In general, the impairment correlation matrix is Hermitian symmetric, so only the diagonal and one of the upper or lower triangles would be used. This property can be used throughout, so that only unique matrix elements need to be computed and stored by the exemplary receiver. Also, it may be desirable to restrict the instantaneous model fitting parameter estimates that result. For example, any estimates less than zero could be reset to zero and the receiver could be configured to then solve for the other estimate(s).

After obtaining the instantaneous fitting parameter values, the exemplary receiver uses them to update the long-term model fitting parameters. The exemplary receiver can be configured with essentially any low-pass filter to smooth the instantaneous fitting parameter estimates. One efficient filter is given by $$\begin{bmatrix} \alpha(n) \\ \beta(n) \end{bmatrix} = \lambda \begin{bmatrix} \alpha(n-1) \\ \beta(n-1) \end{bmatrix} + (1-\lambda) \begin{bmatrix} \alpha_{inst} \\ \beta_{inst} \end{bmatrix}, \quad (10)$$

where n denotes the current slot, and where $0 < \lambda \leq 1$.

Figure 2:
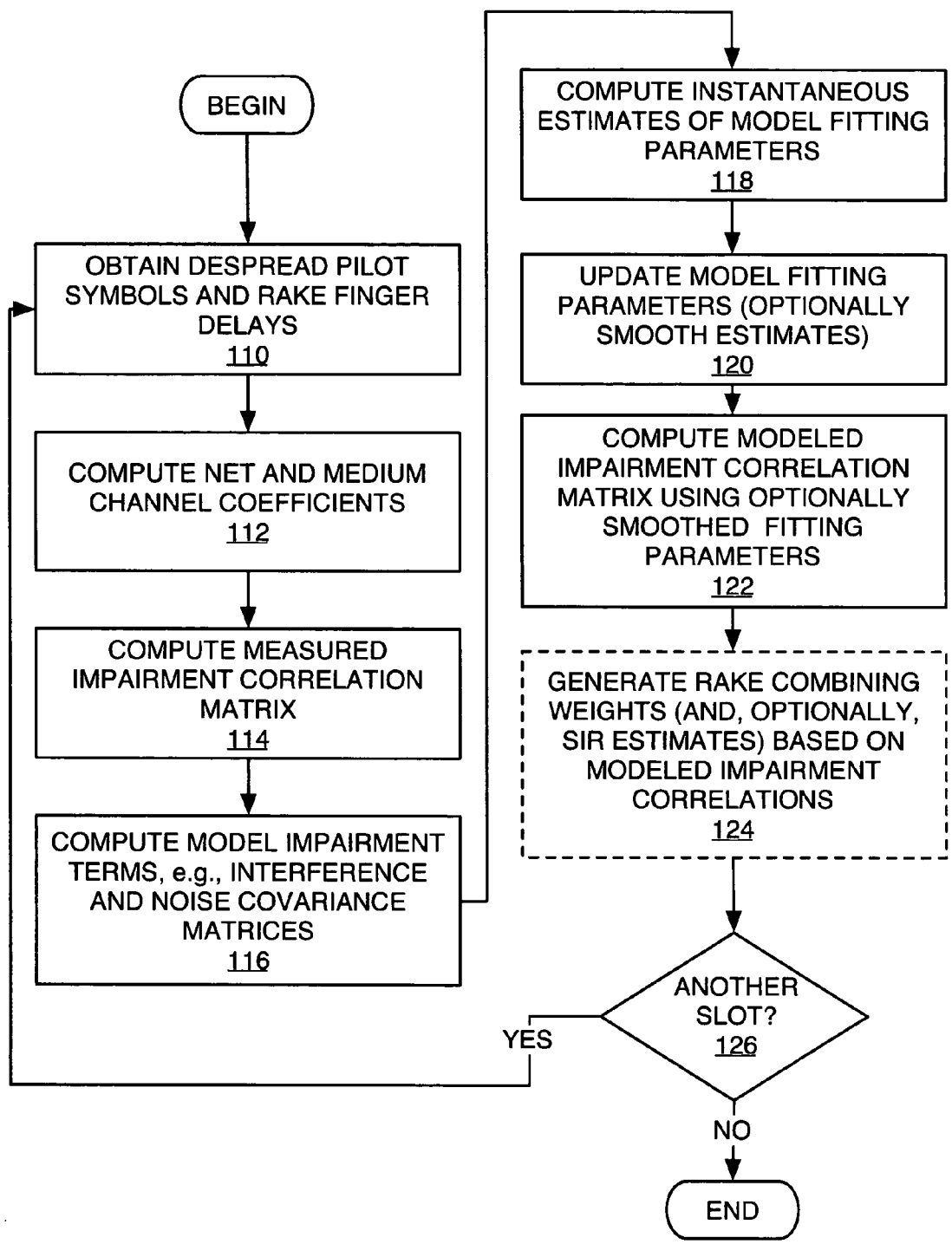
FIG. 2 is a more detailed diagram of an exemplary method of modeling received signal impairment correlations according to the present invention.

FIG. 2 sets out the above method's operations in exemplary processing logic that can be implemented in the receiver using an appropriately programmed DSP, microprocessor, or the like. The illustrated logic assumes that the receiver is configured to provide a set of combining weights for every slot, such as for every traffic channel slot in a WCDMA system, wherein the receiver receives ten (10) pilot channel symbols on a Common Pilot Channel (C-PICH) signal during each slot.

For each slot the receiver obtains desired (despread) pilot (CPICH) symbols and RAKE finger delays (Step 110), and estimates net and medium channel coefficients (Step 112) using the CPICH, as follows. First, for only fingers that correspond to paths (channel delays), we compute $$\hat{h} = \frac{1}{10} \sum_{i=0}^{9} x(i) s^*(i), \quad (11)$$

where $\hat{h}$ comprises net channel coefficients, x(i) is a vector of despread CPICH symbols corresponding to channel delays for symbol index i, s(i) is a reference CPICH symbol for symbol index i. In general, embedded pilot symbols or data symbols and decision feedback may also be used.

Next, the exemplary receiver estimates medium coefficients for channel delays based on, $$\hat{g} = \begin{bmatrix} R_p(\tau_0 - \tau_0) & R_p(\tau_0 - \tau_1) & \ldots & R_p(\tau_0 - \tau_{L-1}) \\ R_p(\tau_1 - \tau_0) & R_p(\tau_1 - \tau_1) & \ldots & R_p(\tau_1 - \tau_{L-1}) \\ \vdots & \vdots & \ddots & \vdots \\ R_p(\tau_{L-1} - \tau_0) & R_p(\tau_{L-1} - \tau_1) & \ldots & R_p(\tau_{L-1} - \tau_{L-1}) \end{bmatrix}^{-1} \tilde{h}, \quad (12)$$

and then estimates net channel coefficients for all the G-RAKE fingers via $$\tilde{h} = \begin{bmatrix} R_p(d_0 - \tau_0) & R_p(d_0 - \tau_1) & \ldots & R_p(d_0 - \tau_{L-1}) \\ R_p(d_1 - \tau_0) & R_p(d_1 - \tau_1) & \ldots & R_p(d_1 - \tau_{L-1}) \\ \vdots & \vdots & \ddots & \vdots \\ R_p(d_K - \tau_0) & R_p(d_K - \tau_1) & \ldots & R_p(d_K - \tau_{L-1}) \end{bmatrix} \hat{g}. \quad (13)$$

The exemplary receiver then computes the measured impairment correlation matrix (Step 114) as, $$\hat{R} = \frac{1}{9} \sum_{i=0}^{9} (x(i)s^*(i) - \tilde{h})(x(i)s^*(i) - \tilde{h})^H, \quad (14)$$

and computes the model's impairment correlation terms—interference and noise—(Step 116) based on, $$R_I(d_1, d_2) = \sum_{l=0}^{L-1} \sum_{q=0}^{L-1} \hat{g}_l \hat{g}_q^* \sum_{\substack{m=-\infty \\ m \neq 0}}^{m=\infty} R_p(d_1 - mT_c - \tau_l) R_p^*(d_2 - mT_c - \tau_q) \quad (15)$$

$$R_n(d_1, d_2) = R_p(d_1 - d_2).$$

Note that in practice, the infinite summations may be truncated. The exemplary receiver then optionally calculates instantaneous values of the model fitting parameters $\alpha_{inst}$ and $\beta_{inst}$ (Step 118) using Eq. (7) given above. (It should be understood that smoothing may be skipped for one or both of the interference impairment matrix scaling factor and the noise impairment matrix scaling factor.)

Processing continues with the receiver updating the model fitting parameters $\alpha$ and $\beta$ based on the instantaneous values using Eq. (10) above (Step 120). The receiver then computes the modeled impairment correlation matrix, $\tilde{R}(\text{slot})$, to be used in generating the RAKE combining weights, and an SIR estimate for the current slot using the results from the above steps (Step 122). The receiver then can compute a SIR estimate and the RAKE combining weights used by the G-RAKE receiver circuit such that the combination of the different signal images is carried out in consideration of the modeled impairment correlations between those images (Step 124). These steps generally are repeated for each of a series of successive slots (Step 126).

The G-RAKE receiver forms combining weights using $\tilde{R}(\text{slot})$, and $\tilde{h}$ by basically computing:

$$w = \tilde{R}^{-1}(\text{slot})\tilde{h}. \quad (16)$$

Rather than inverting a matrix, an iterative approach such as Gauss-Seidel can be used. The decision variable or symbol estimate is obtained by combining the traffic despread values, denoted y, giving $$z = w^H y. \quad (17)$$

The G-RAKE receiver also forms a SIR estimate using $\tilde{R}(\text{slot})$ and $\tilde{h}$ by basically computing:

$$SIR = \tilde{h}^H \tilde{R}^{-1}(\text{slot})\tilde{h} = \tilde{h}^H w \quad (18)$$

where superscript H denotes Hermitian transpose.

As for initialization of the impairment correlation model, one approach would be to initialize using the RAKE solution. This involves setting $\alpha$ to 0 and $\beta$ to a positive value, such as 1 or an estimate of noise power, obtained by conventional means. Of course, other forms of initialization are possible and may be used as needed or desired.

While specific approaches for channel estimation and parameter fitting are given, the invention is not limited to these particular approaches. Below is described a second embodiment which employs different approaches for channel estimation and parameter fitting. This embodiment offers an exemplary method of computing channel estimates based on an interpolative approach. The summation limits in the below equations assume a WCDMA slot wherein one transmit antenna sends ten pilot symbols per traffic slot.

With the second embodiment, the medium coefficients are set equal to the net coefficients ($\hat{g} = \tilde{h}$). The net coefficients are computed for all fingers as an interpolative function of time within the slot. Specifically, Step 112 computes the net and medium coefficients using $$\tilde{h}(m) = \left(\frac{7-m}{5}\right) \frac{1}{5} \sum_{i=0}^{4} x(i)s^*(i) + \left(\frac{m-2}{5}\right) \frac{1}{5} \sum_{i=5}^{9} x(i)s^*(i) \quad (19)$$

The two summation terms may be viewed as channel measurements. With this time varying response, the measured impairment correlation matrix (Step 114) for the current slot is given by $$\hat{R} = \left(\frac{256}{SF}\right) \frac{1}{9} \sum_{i=0}^{9} [x(i)s^*(i) - \tilde{h}(i)][x(i)s^*(i) - \tilde{h}(i)]^H \quad (20)$$

where SF is the spreading factor of the traffic data. Scaling by 256/SF is used here to get absolute impairment levels. Here only the diagonal elements of this matrix are computed.

Note that the effect of using interpolated channel estimates as given above is that the channel estimate for measuring impairment correlations across a given interval, e.g., a WCDMA slot, can change to reflect, for example, changing fading conditions. This method contrasts with the alternative approach where impairment correlations (e.g., interference covariance) is computed as the difference between each one in a series of samples taken across the slot and a channel estimate value that is unchanging for the entire slot.

With this embodiment, we may optionally smooth the measured impairment correlation matrix before using it to perform parameter fitting for the impairment correlation model. Such smoothing can be done with exponential filtering. This can be considered part of Step 114. Once this is done, we denote the diagonal element corresponding to finger f as $\hat{r}(f)$. If smoothing is used, then we are basically fitting a smoothed measurement of the impairment correlation matrix to a smoothed model of the impairment correlation. Next, we compute the fitting parameters. Rather than using LS joint fitting approach, we simply fit (update) the model by determining one parameter and then the other.

This method of determining the model fitting parameters exploits the fact that the term β essentially is the noise power, which may be obtained using the diagonal elements of the measured impairment correlation matrix, $\hat{R}$, according to the method given below. While such details provide specific methodology, the broad approach is best understood as obtaining a first summation of terms that include both noise and interference powers in first proportional amounts and then subtracting a second summation of terms that include noise and interference powers but in a different proportion than the first such that subtracting the second summation from the first yields a reasonably good estimate for β.

To do this, we partition the set of fingers, denoted F, into two subsets: P and E. The set P corresponds to fingers placed on signal paths. The set E corresponds to "extra" fingers placed off of the signal path delays. Also, we use |P| and |E| to denote the number of fingers in these subsets. We compute $$\beta_{inst} = \left(\sum_{f \in P} SF \times \hat{r}(f)\right) - \frac{(|P|-1)}{|E|}\left(\sum_{f \in E} SF \times \hat{r}(f)\right). \quad (21)$$

With this embodiment, smoothing to obtain β is optional—thus processing may use $\beta_{inst}$ or a smoothed version of it.

Now, to obtain the second parameter, α, we use $$\alpha_{inst} = \frac{\sum_{f \in F}(\hat{r}(f) - q(\beta_{inst})r_n(f))}{u\left(\sum_{f \in F} r_1(f)\right)} \quad (22)$$

where the numerator is a function of the difference between the element corresponding to finger f in the measured covariance matrix and the corresponding element in the modeled noise correlation matrix as weighted by a function of β. The weighting given by q overemphasizes the noise by a desired amount and provides an added measure of stability to the problem solution. The more weight given, the more the solution leans toward a RAKE solution. Also, the denominator is given as u, which is a function that optionally smoothes the argument over time. Ideally, this should smooth the modeled correlation at the same level as the measured impairment correlation is smoothed.

The mapping function q for example can be a linear function given as $$q(x)=ax+b. \quad (23)$$

It is recommended that a be chosen in the range [1,2] and b be chosen in the range [0,0.1]. A good choice is a=2, b=0. Optionally, $\alpha_{inst}$ may be smoothed to obtain α.

Figure 3:
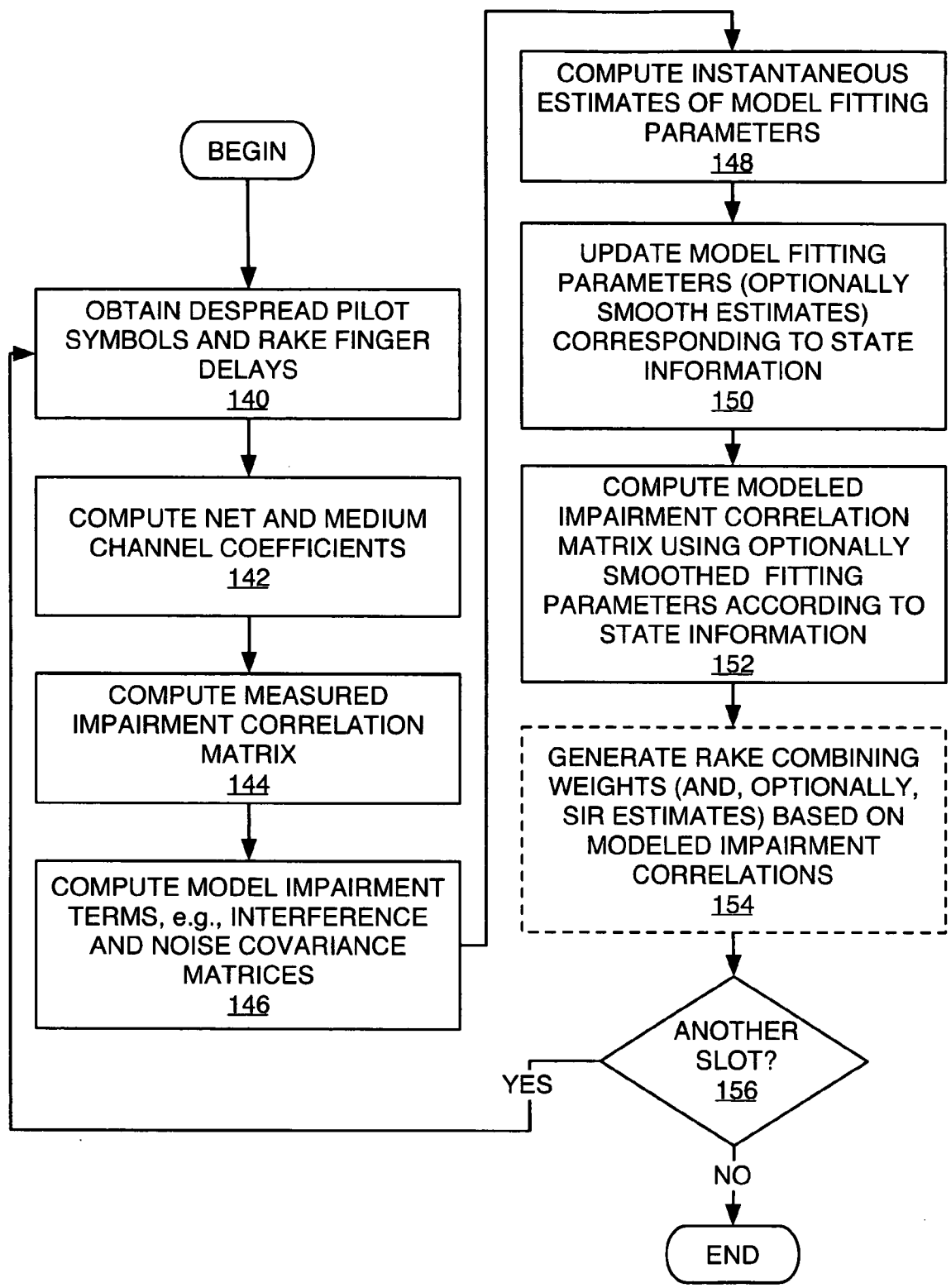
FIG. 3 is another exemplary embodiment of modeling received signal impairment correlations.

Another embodiment of the present invention may have particular advantages in the context of WCDMA's High Speed Downlink Shared Channels (HS-DSCHs). Thus, FIG. 3 illustrates exemplary processing logic in Steps 140-156 that largely corresponds to the steps given in FIG. 2 with the exception that such operations consider certain state information, e.g., Steps 150-154 are based on state-specific information as detailed below.

With HS-DSCH, a WCDMA base station allocates a portion of its power to high-speed packet data access. For example, it may allocate seventy percent of its power to voice users and transmit to them all the time. The remaining thirty percent of its power may be allocated to HS-DSCH on an as needed basis. That is, the base station only transmits the HS-DSCH signal when there are packets to send. Thus, the base station generally operates in one of two states: a full-power state when it is transmitting voice traffic and HS-DSCH traffic, and a reduced-power state when it is not transmitting HS-DSCH traffic.

The exemplary receiver can be configured to use state-dependent impairment correlation model information. A mobile terminal using the HS-DSCH service normally monitors control information that tells it which state the base station is in. Thus, the mobile terminal can determine which state-based information to use for calculation of the impairment correlation model.

In an exemplary embodiment, the impairment correlation model can be based on the same two impairment terms as given above, i.e., an interference term and a noise term, but the model fitting parameter a is different between the two states. Thus, the mobile terminal can maintain two separate parameter values, $\alpha_1$, and $\alpha_2$. When demodulating a given slot or a particular Transmit Time Interval (TTI), the mobile terminal can use the parameter corresponding to the state of the base station.

Thus, with respect to FIG. 3, when the model fitting parameters are estimated, the instantaneous value is used to update (smooth) the corresponding model fitting parameter value that corresponds to the state of the system. This updated value is then used to form the model $\tilde{R}(slot)$ that is used to generate the RAKE combining weights. Initially, a single value can be estimated and then used to initialize the second parameter. Of course, other forms of initialization are possible. Similarly, the mobile terminal may wish to keep multiple values of β, corresponding to different states of neighboring base stations. Considering state information for neighboring base stations has value, for example, where the mobile terminal monitors multiple base stations to determine whether it should be served by another base station.

For a mobile terminal not using HS-DSCH service, several options are available. One is to simply use the first embodiment of the present invention as exemplified by the processing logic of FIG. 2. The model fitting parameter values can be averaged over the two states of base station operation. Another option is for such mobile terminals to monitor HS-DSCH control information, and use the state information to have state-dependent model fitting parameters according to the logic of FIG. 3, for example. Yet another option is for the mobile terminal blindly to estimate which state the base station is in and maintain multiple model fitting parameter values accordingly. The state can be estimated blindly by measuring impairment power and thresholding this to form different states, for example.

With the above exemplary embodiments in mind, FIG. 4 broadly illustrates a transmitter 10, e.g., a wireless network base station, and a receiver 12, e.g., a mobile terminal or other wireless communication device. An exemplary transmitter 10 uses spread-spectrum modulation to transmit spread-spectrum signals including a traffic signal and a pilot signal. The signals pass through a radio channel and are received at one or more antennas of receiver 12. Thus, receiver 12 receives the transmitted signal(s) plus noise and interference, and a radio processor 14 generates received signal samples, r, from that corrupted received signal. While the details of radio processor 14 in at least some embodiments will be familiar to those skilled in the art, an exemplary radio processor 14 comprises filtering and conversion circuits, e.g., analog-to-digital converters, such that the received signal is represented by a series of digitized baseband signal samples input to a G-RAKE processor 16. In turn, processor 16 demodulates the received signal samples to produce soft values or bit estimates. These estimates are provided to one or more additional processing circuits 18 for further processing, such as forward-error-correction (FEC) decoding and conversion into speech, text, or graphical images, etc. Those skilled in the art will recognize that the particular information type(s) carried by the received signal and the particular processing steps applied by receiver 12 are a function of its intended use and type. Processor 16 also estimates received signal quality by producing SIR estimates that also are based on the modeled impairments.

FIG. 5 illustrates an exemplary processor 16 comprising a correlation circuit 20, a combiner circuit 22, a finger placement circuit 24, and a combining weight and SIR estimate generation circuit 26. In operation, received samples are provided to the finger placement circuit 24, which determines what delays to use in correlating the received signal samples to the traffic spreading sequence(s). These delays are used in correlation circuit 20 to delay either the received signal sample stream or the spreading codes used by the individual RAKE fingers in the correlation circuit 20 to produce traffic correlation values according to the various finger placements. The delays are also provided to the combining weight and SIR estimate generation circuit 26, which computes the RAKE combining weights used to combine the RAKE finger output signals from the correlation circuit 20. It also computes an SIR estimate. The finger output signals from correlation circuit 20 are combined using the combining weights in the combiner 22, producing combined values or soft bit values.

An exemplary correlation circuit 20 comprises a plurality of correlation units, also referred to herein as RAKE fingers, and each correlation unit can be placed at a desired relative time offset with respect to the received signal using correlation code offsets and/or adjustable delay elements, such as buffers. In exemplary G-RAKE operation, finger placement circuit 24 controls correlation circuit 20 such that one or more RAKE fingers are time aligned with the relative path delays of selected signal images in the received signal (on-path fingers) and, typically, one or more of the RAKE fingers are placed off-path. Processor 16 can be configured to adjust the alignment of on-path and/or off-path RAKE fingers dynamically to maximize the SNR of the RAKE combined signal output from the combiner circuit 22.

On that point, G-RAKE processor 16 offers improved performance compared to conventional RAKE receivers under at least some reception conditions by considering the effects of received signal impairment correlations between the RAKE fingers in its generation of the RAKE combining weights. Of course, in the context of the present invention, combining weight generation benefits from the use of modeled impairment correlations. To that end, FIG. 6 illustrates an exemplary combining weight and SIR generation circuit 26 that is configured to generate RAKE combining weights according to one or more exemplary embodiments of model-based signal impairment compensation.

According to the illustration, circuit 26 comprises a correlation circuit 30, a channel tracker circuit 32, a SIR calculator 33, a combining weight calculation circuit 34, an impairment correlation estimation circuit 36, a structured element calculation circuit 38, a model fitting parameter calculation circuit 40, and a modeled impairment calculation circuit 42. These latter three elements functionally cooperate as a "impairment modeling circuit" that may be implemented in hardware and/or in software.

In operation, the received samples are provided to correlation circuit 30, which correlates the received samples to a pilot or other reference signal spreading sequence, and removes symbol modulation producing pilot correlation values. The channel tracker circuit 32 receives these pilot correlations and uses them to estimate or otherwise track channel coefficients for the received signal. These coefficients are provided to estimation circuit 36, which also receives the pilot correlations. Circuit 36 is configured to obtain impairment samples, i.e., impairment measurements for the received signal, by subtracting channel estimates from the pilot correlations and further configured to calculate impairment correlation measurements by correlating the impairment samples with each other and with themselves.

Structured element calculation circuit 38 receives the channel estimates and uses them to construct the elements corresponding to the impairment terms $R_I$ and $R_n$ of the impairment model, which are referred to herein as structured elements. The impairment correlation measurements, i.e., matrix $\hat{R}$, and the structured elements are provided to the model fitting parameter calculation circuit 40, which uses them to form the model fitting parameters $\alpha$ and $\beta$. The fitting parameters and the structured elements are provided to the modeled impairment calculation circuit 42, which produces the modeled impairment correlation matrix $\widetilde{R}$. The channel estimates and the modeled impairment correlation matrix are provided to the weight calculation circuit 34, which produces the combining weights to be used by combiner circuit 22 in RAKE combining the finger output signals from correlation circuit 20. The channel estimates and the modeled impairment correlation matrix are also provided to the SIR calculator 33, which produces a SIR estimate for power control purposes.

In an exemplary embodiment, a receiver circuit to determine received signal impairment correlations for use in received signal processing comprises the impairment correlation estimator 36, which in an exemplary configuration measures received signal impairment correlations for a received signal of interest, and the one or more impairment modeling circuits (e.g., circuits 38, 40, and 42), which in an exemplary configuration implement a model of received signal impairment correlations that comprises one or more impairment terms scaled by corresponding model fitting parameters. The exemplary impairment modeling circuits further adapt each of the model fitting parameters responsive to recurring measurements of the received signal impairment correlations as provided by the impairment correlation estimator. As illustrated, such a receiver circuit may be included in or associated with a RAKE processor and/or with a SIR estimator, both of which may use the modeled received signal impairment correlations in their operations.

With the above exemplary details in mind, those skilled in the art will appreciate that the present invention broadly fits measured received signal impairment correlations, which typically have some estimation errors, to an impairment model comprising a structured form that is the scaled sum of structured matrix elements. Thus far, the use of two structured matrices has been illustrated, one representing an interference term and the other a noise term. In the context of a mobile receiver operating in a cellular communication network, the interference term may represent own-cell interference and the noise term may represent white noise and other interference. As will be shown below, that model can be extended to include an other-cell interference term scaled by a corresponding model fitting parameter.

In general, the method can be extended to include additional model terms by including other structured elements corresponding to, among other things, other-cell interference. In modeling one additional base station, Eq. (4) becomes:

$$\hat{R} \approx \alpha R_f + \beta R_n + \gamma R_0 \quad (24)$$

where $R_0$ corresponds to other-cell interference. The structure for other-cell interference is slightly different than that of own-cell interference, as there is no orthogonal code property for this form of interference. As a result, the elements of $R_0$ are given by, $$R_0(d_1, d_2) = \sum_{l=0}^{\tilde{L}-1} \sum_{q=0}^{\tilde{L}-1} \tilde{g}_l \tilde{g}_q^* \sum_{m=-\infty}^{m=\infty} R_p(d_1 - mT_c - \tilde{\tau}_l) R_p^*(d_2 - mT_c - \tilde{\tau}_q), \quad (25)$$

where the tilde over the g terms indicates that they are medium channel coefficients corresponding to the channel from the other-cell base station to the receiver which has $\tilde{L}$ paths. The exemplary receiver can be configured to estimate these terms by correlating to the pilot signal of the other-cell base station. Notice also that m=0 is not excluded in the last summation.

In Eq. (25) above, it is assumed that the medium channel coefficients corresponding to the channel from the other-cell base station to the receiver are estimated. In cases where the instantaneous medium channel coefficients are not available, $R_0(d_1,d_2)$ can be formed through any number of alternatives, including the following exemplary alternatives.

If the average path strength and delays corresponding to the channel from the other-cell base station to the receiver are available from the searcher, $R_0(d_1,d_2)$ can be formulated as $$R_0(d_1, d_2) = \quad (25a)$$

$$\sum_{l=0}^{\tilde{L}-1} E[|\tilde{g}_l|^2] \sum_{m=-\infty}^{m=\infty} R_p(d_1 - mT_c - \tilde{\tau}_l) R_p^*(d_2 - mT_c - \tilde{\tau}_l).$$

If the path searcher only provides the delay corresponding to the dominant echo, $R_0(d_1,d_2)$ can be formulated as $$R_0(d_1, d_2) = \sum_{m=-\infty}^{m=\infty} R_p(d_1 - mT_c - \tilde{\tau}_0) R_p^*(d_2 - mT_c - \tilde{\tau}_0). \quad (25b)$$

In this case, the path strength is folded into γ.

Another way to extend the method to other-cell interference is to model the other-cell interference as white noise that has passed through the transmit pulse shaping filter. This approach does not require estimating the channel response of another base station. The resulting $R_0(d_1,d_2)$ is simply:

$$R_0(d_1,d_2) = R_q(d_1-d_2) \quad (26)$$

where $R_q(\tau)$ is the autocorrelation function of the pulse shape convolved with itself, possibly normalized so that the zero-lag element is one.

Note that it is possible to utilize a combination of these different approaches. In this case, the correlation matrix of other-cell interference can be expressed as a weighted sum of the $R_0(d_1,d_2)$ in equations (25), (25a), (25b) and (26).

When the exemplary receiver is in soft handoff between two or more base stations there are two or more received signals of interest, e.g., traffic signals, being transmitted for the receiver by the network from different radio sectors or from different sites.

In such cases the receiver assigns one set of its RAKE fingers to extract one of the signals and another set of its RAKE fingers to extract the other. These sets of fingers can be treated separately, as far as combining weight computation is concerned. Thus, the present invention can be applied separately to each finger set.

In such soft handoff cases, the receiver performs channel estimation for multiple base stations. Thus, the receiver could be configured to include other-cell interference in its impairment model, e.g., include the effects of other-cell interference in the model's impairment correlation matrix. When computing combining weights for the first base station signal, the receiver would treat the second base station signal as other-cell interference. When computing weights for the second base station signal, it would treat the first base station signal as other-cell interference.

Besides soft handoff, another way that the receiver receives multiple transmitted signals is when transmit diversity is used. In WCDMA, there are basically two forms of transmit diversity. One form is open loop or STTD, which uses an Alamouti approach to code information across the two transmit antennas. Another form is closed loop, which relies on feedback so that the same symbols sent from the two antennas arrive in-phase at the receiver. In either case, there are effectively only 5 pilot symbols instead of 10 in a slot for each transmit antenna. Thus, in equation 11 the summation would be from 0 to 4 and $$\frac{1}{10}$$

would be replaced by $$\frac{1}{5}.$$

For Eq. 19, we can use $$\tilde{h}(m) = \left(\frac{3-m}{2.5}\right)\frac{1}{2}\sum_{i=0}^{1} x(i)s^*(i) + \left(\frac{m-0.5}{2.5}\right)\frac{1}{3}\sum_{i=2}^{4} x(i)s^*(i). \quad (27)$$

Also, in either case, the impairment correlation matrix is modeled like in the multiple base station case, with a term for each transmit antenna (see (24)). However, in (25), the m=0 term should be excluded, just as in (15). For additional exemplary details on these and related calculations, one may refer to the co-pending and commonly assigned U.S. patent application, which is titled "A METHOD AND APPARATUS FOR RECEIVED SIGNAL QUALITY ESTIMATION," and which is assigned Attorney Docket No. 4015-5191. That application, filed on even date herewith, is incorporated herein by reference in its entirety.

One approach is to have only one R matrix of the form of (24). Details of how this matrix is used are given below. Note that this model can be used whether or not the particular receiver is using transmit diversity or not. Thus, as long as the base station is transmitting something on two antennas, then such an extended model of the impairment correlation matrix should be used. For the STTD approach, data symbols are transmitted in pairs. On transmit antenna 1, symbol 1 is sent in the first symbol period, whereas symbol 2 is sent in the second symbol period. On transmit antenna 2, the negative conjugate of symbol 2 is sent in the first symbol period, whereas the conjugate of symbol 1 is sent in the second symbol period. Let $\tilde{h}_A$ be the response from transmit antenna A and $\tilde{h}_B$ be the response from transmit antenna B. Then the following two weight vectors are formed:

$$w_A = \tilde{R}^{-1}(\text{slot})\tilde{h}_A \quad (28)$$

$$w_B = \tilde{R}^{-1}(\text{slot})\tilde{h}_B. \quad (29)$$

Let $y_1$ and $y_2$ be the vectors of traffic despread values during the first and second symbol periods. Then the decision variables for symbols 1 and 2 are obtained by $$z_1 = e_A^H y_1 + (w_B^H y_2)^* \quad (30)$$

$$z_2 = w_A^H y_2 - (w_B^H y_1)^*. \quad (31)$$

Thus, the impairment correlation matrix would be used to form two combining weight vectors. The SIR can be estimated using $$SIR = \tilde{h}_A^H \tilde{R}^{-1}(\text{slot})\tilde{h}_A + \tilde{h}_B^H \tilde{R}^{-1}(\text{slot})\tilde{h}_B = \tilde{h}_A^H w_A + \tilde{h}_B^H w_B. \quad (32)$$

Thus, the SIR would be the sum of two SIR terms. For the closed loop approach, the same symbol is transmitted using the same spreading code from the two transmit antennas. In one closed loop approach, the relative phase of the two transmissions is adapted. In the other approach, relative amplitude is also changed. For simplicity, we can think of this as sending the symbol s on one antenna and symbol es on the other where e is a complex quantity. The receiver would know e or could learn it from the transmissions. From the two pilot channels, the receiver would estimate two responses $\tilde{h}_A$ and $\tilde{h}_B$. The combining weights would then be formed using $$w = \tilde{R}^{-1}(\text{slot})(\tilde{h}_A + e\tilde{h}_B) = \tilde{R}^{-1}(\text{slot})\tilde{h}_\tau. \quad (33)$$

SIR would be estimated using $$SIR = \tilde{h}_\tau^H \tilde{R}^{-1}(\text{slot})\tilde{h}_\tau = \tilde{h}_\tau^H w. \quad (34)$$

In general, with transmit diversity we have a number of options for computing the impairment correlations. Broadly, the exemplary receiver may be configured in one or more ways depending on the diversity scenario. Where there are separate (RAKE) finger locations for each transmit diversity signal, we may use separate impairment correlation models with separate fitting. Conversely, where the finger locations are the same for all transmit diversity signals, we can "stack" Eq. (6) by adding elements to the vectors and matrices accounting for all transmit diversity signals. Pre-combining the impairment correlation measurements, $\hat{R}_1, \hat{R}_2, \ldots, \hat{R}_n$, for transmit diversity signals 1 ... n represents another approach. For the in-between case wherein only some fingers positions between the transmit diversity signals are the same, the exemplary receiver can be configured to use subsets of a correlation matrix formed based on the fingers used for each transmit diversity signal.

For the separate modeling case, the exemplary receiver models the impairment correlations separately for each transmit antenna. Thus, using transmit antennas 1 and 2 as an example, the receiver would determine the impairment correlations as $\hat{R}_1 = \alpha_1 R_{I1} + \beta_1 R_n + \gamma_1 R_{I2}$ for Antenna 1, and as $\hat{R}_2 = \alpha_2 R_{I1} + \beta_2 R_n + \gamma_2 R_{I2}$ for Antenna 2. Using per-antenna models may be particularly advantageous where the transmit antennas are physically separated from each other. Making the necessary impairment correlation measurements needed for model fitting may be based on receiving separate pilot signals from the different antennas.

For cases where there is only a partial overlap of finger positions between the different antennas, the receiver may form the combining weight vectors based on subsets of an impairment correlation matrix. For example, assuming that receiver finger positions 0, 1, and 2 were assigned to Transmit Antenna 1 and finger positions 0, 1, and 3 were assigned to Transmit Antenna 2, we see that positions 0 and 1 overlap between the two antennas but positions 2 and 3 do not. In this instance, the impairment correlation matrix R would include four columns (0, 1, 2, 3) and four rows (0, 1, 2, 3) but only the corresponding 3×3 subset of that matrix would be used for each antenna to generate the combining weights and SIR estimates.

If the receiver includes multiple receive antennas, it can be configured to assign one or more of its RAKE fingers to one receive antenna signal, and assign one or more remaining fingers to each of the other receive antennas. In other words, the exemplary receiver can allocate a subset of its RAKE fingers to each receive antenna, and can be configured to perform channel estimation separately for each antenna. In such cases, impairment correlation measurements can proceed as before except that some of the correlation measurements correspond to correlations of impairment between different receive antennas.

Similarly, the overall channel estimates comprise sets of channel estimates corresponding to the different receive antennas. Thus, let $h_1$ and $h_2$ represent the net channel responses for first and second receive antennas, respectively. Further, let $R_{i,j}$ be the impairment correlation matrix between fingers on antenna i and j branches, i.e., the (m,n)-th element of $R_{i,j}$ is the interference correlation of RAKE finger m on the i antenna branch and finger n on the j antenna branch. In this case, the RAKE combining weights can still be formulated as $$w = R^{-1}h, \text{ where} \quad (35)$$

$$h = [h_1^T, h_2^T]^T, \text{ and } R = \begin{bmatrix} R_{11} & R_{12} \\ R_{21} & R_{22} \end{bmatrix}. \text{ Note that } R_{21} = R_{12}^H.$$

Impairment correlations among fingers from the same antenna branch ($R_{11}$ and $R_{22}$) can be estimated using methods discussed thus far. Impairment correlation between fingers from different antenna branches can be estimated as follows.

First a measurement of $R_{12}$ is computed from impairment realizations, which measurement may be denoted as $\hat{R}_{12}$. From the foregoing information, it should be understood that $R_{12}$ can be expressed as a weighted sum of an own-cell interference component, $R_{12,I}$ and an other-cell interference component, $R_{12,O}$, $$\tilde{R}_{12} = \alpha R_{12,I} + \gamma R_{12,O}. \quad (36)$$

The weighting factor α is determined by own-cell power, whereas γ is determined by other-cell interference power and, in some cases, also by the correlation between antennas. The white noise can be assumed to be uncorrelated between antennas. Note that the same a and γ appear in all four sub-matrices. When antenna gains differ, it may help to have different β values for $R_{11}$ and $R_{22}$.

The (i,j)-th element of $R_{12,I}$ and $R_{12,O}$ can be computed from net response and pulse autocorrelation as $$R_{12,I}(d_i, d_j) = \sum_{l=0}^{L-1} \sum_{q=0}^{L-1} g_{1,l} g_{2,q}^* \sum_{\substack{m=-\infty \\ m \neq 0}}^{m=\infty} R_p(d_i - mT_c - \tau_l) \quad (37)$$

$$R_p^*(d_j - mT_c - \tau_q)$$

$$R_{12,O}(d_i, d_j) = \sum_{l=0}^{L-1} \sum_{q=0}^{L-1} \tilde{g}_{1,l} \tilde{g}_{2,q}^* \sum_{m=-\infty}^{\infty} R_p(d_i - mT_c - \tilde{\tau}_l)$$

$$R_p^*(d_j - mT_c - \tilde{\tau}_q),$$

where $g_{i,l}$ is the medium channel coefficients corresponding to the lth path from the own-cell base station to the receiver antenna i, and $\tilde{g}_{i,j}$ is the medium channel coefficients corresponding to the lth path from the other-cell base station to the receiver antenna i.

Note that in Eq. (37), it is assumed that the medium channel coefficients corresponding to the channel from the other-cell base station to the receiver are estimated. In cases where the instantaneous medium channel coefficients are not available, $R_{12,O}(d_i,d_j)$ can be formed by other means, such as through one of the following alternatives.

If the path average strength and delays corresponding to the channel from the other-cell base station to the receiver are available from a searcher circuit in the receiver, then $R_{12,0}(d_i, d_j)$ can be formulated as $$R_{12,O}(d_i, d_j) = \qquad (38)$$

$$\sum_{l=0}^{L-1} E[|\tilde{g}_{1,l}|^2] \sum_{m=-\infty}^{m=\infty} R_p(d_i - mT_c - \tilde{\tau}_l) R_p^*(d_j - mT_c - \tilde{\tau}_l).$$

In this case, the correlation between antennas is folded into γ.

If the path searcher only provides the delay corresponding to the dominant echo, $R_{12,O}(d_i,d_j)$ can be formulated as $$R_{12,O}(d_i, d_j) = \sum_{m=-\infty}^{m=\infty} R_p(d_i - mT_c - \tilde{\tau}_0) R_p^*(d_j - mT_c - \tilde{\tau}_0). \quad (39)$$

In this case, both the correlation between antennas and the path strength are folded into γ.

Another way to extend the impairment model to include impairment correlations arising from other-cell interference is to model the other-cell interference as white noise that has passed through the transmit pulse shaping filter. This approach does not require estimating the channel response of another base station. The resulting $R_{12,O}(d_i,d_j)$ is simply:

$$R_{12,O}(d_i, d_j) = R_q(d_i - d_j). \quad (40)$$

Note that it is possible to utilize a combination of these different approaches. In such cases, the correlation matrix of other-cell interference can be expressed as a weighted sum of the $R_{12,O}(d_i,d_j)$ in Eqs. (37), (38), (39) and (40). Further, if finger delays are spaced no closer than three-fourths of a chip apart, the other cell interference covariance can be approximated as $R_{12,O}=I$. With $\hat{R}_2$, $R_{12,I}$ and $R_{12,O}$, unknown weighting factors α and γ can be solved using the least squares approach. Preferably, $\hat{R}_{11}$, $\hat{R}_{12}$, and $\hat{R}_{22}$ are used together to solve for α, β, and γ.

Of course, these multi-transmitter and multi-antenna embodiments represent just some of the many possible variations that can be practiced in accordance with the present invention. Those skilled in the art will recognize additional features and advantages falling within the scope of the present invention. Fundamentally, the present invention comprises a method and apparatus wherein received signal impairment correlations are compensated for in RAKE combining weight generation using a model-based approach that yields computational and performance advantages. Such advantages are gained at least in part by forming the model as one or more structured elements scaled by model fitting parameters allowing the model to be efficiently adapted at each of one or more successive time instants based on fitting the parameters in accordance with measured impairments.

The impairment model may be configured to consider multiple sources of interference, such as same-cell and other-cell interference, and may be configured for operation with respect to multiple transmitted signals from two or more radio sectors and/or base stations in a cellular radio environment, and/or with respect to multiple transmitted signals as obtained from two or more receive antennas. FIG. 7 provides an exemplary illustration of a wireless communication network 50, which may be configured as a WCDMA wireless cellular network, as an IS-95/IS-2000 wireless cellular network, or configured according to some other open or proprietary communication standard.

Network 50 supports a plurality of mobile terminals 52—only one terminal is shown for clarity—operating in one or more radio service areas denoted as C1, S1, C2, S2, and so on, to represent Cell 1, Sector 1 and Cell 2, Sector 2, etc. Those skilled in the art will appreciate that the terms "cell" and/or "sector" as used herein should be given broad construction and, in general, the term sector should be understood as identifying a given radio coverage area at a given carrier frequency. Thus, a given cell may have multiple overlaid radio sectors corresponding to multiple carrier frequencies.

In any case, network 50 communicatively couples mobile terminals 52 to one or more external networks 54, such as the Public Switched Telephone Network (PSTN), the Internet or other Public Data Networks, ISDN-based networks, etc. Such coupling is supported by Radio Access Network (RAN) 56, which provides the radio link(s) to the mobile terminals 52, and which interfaces to one or more Core Networks (CNs) 58 that in turn link to the external networks 54. Those skilled in the art will appreciate that the particular network architecture adopted, and the entity nomenclature used varies according to the network standard involved, but such variations are not germane to understanding or explaining the present invention. Moreover, it should be understood that the illustrated network is simplified and that actual network implementations likely will have additional entities not illustrated herein for clarity.

Nonetheless, an exemplary RAN 56 comprises one or more base station systems, each typically comprising a control entity and one or more distributed radio transceiver entities. In the illustration, such entities are depicted as one Base Station Controller (BSC) 60, and a plurality of associated Radio Base Stations (RBSs) 62, e.g., 62-1, 62-2, and 62-3. The illustrated mobile terminal 52 includes the exemplary receiver 12 illustrated earlier herein, which it may implement using various processing circuits, including A/D converters, filters, DSPs or other digital processors, memory, and the like. In at least one exemplary embodiment, mobile terminal 52 includes one or more DSPs and/or Application Specific Integrated Circuits (ASICs), or other programmable devices, to implement receiver 12, including G-RAKE processor, as illustrated in exemplary fashion in FIGS. 4, 5, and 6. It should be understood that at least a portion of the present invention's functionality thus can be embodied as stored computer instructions in the form of micro-code, firmware, software, etc.

More generally, the present invention can be implemented in hardware, software, or essentially any combination thereof, according to the needs of particular design. Indeed, the present invention is not limited by the foregoing discussion or by the accompanying figures. Instead, the present invention is limited only by the following claims and the reasonable equivalents thereof.

What is claimed is:

1. A method of determining received signal impairment correlations using a model for impairment correlations comprising one or more model impairment terms scaled by corresponding model fitting parameters, the method comprising:
computing the one or more model impairment terms;
measuring received signal impairment correlations;
adapting each of the model fitting parameters using a fitting process to fit the modeled impairment terms, as scaled by the model fitting parameters, to the measured received signal impairment correlations; and
calculating the modeled impairment correlations based on the adapted model fitting parameters.

2. The method of claim 1, wherein the model includes an interference impairment term scaled by a first fitting parameter and a noise impairment term scaled by a second fitting parameter.

3. The method of claim 2, wherein measuring the received signal impairment correlations comprises measuring the received signal impairment correlations at each of one or more successive time instants, and wherein adapting each of the model fitting parameters comprises fitting the modeled impairment correlations to the measured received signal impairment correlations by adapting values of the first and second fitting parameters.

4. The method of claim 3, wherein adapting each of the model fitting parameters comprises, for fitting the model, determining the model fitting parameters as instantaneous fitting values or as filtered values obtained from successively determined instantaneous fitting values.

5. The method of claim 4, wherein a received signal being processed comprises a Wideband Code Division Multiple Access (WCDMA) signal, and wherein the model fitting parameters are adapted at successive time instants corresponding to WCMDA signal timeslots.

6. The method of claim 2, further comprising initializing the model by setting the first fitting parameter to zero and setting the second fitting parameter to a positive value.

7. The method of claim 1, wherein the model comprises one of a combined model of received signal impairment correlations for two or more received signals of interest, and a model of received signal impairment correlations for each of two or more received signals of interest.

8. The method of claim 1, wherein a received signal being processed comprises a wireless communication network signal, and wherein the model comprises a model that includes two or more of a same-cell interference impairment term scaled by a first fitting parameter, a noise impairment term scaled by a second fitting parameter, and an other-cell interference impairment term scaled by a third fitting parameter.

9. The method of claim 1, wherein the model comprises an interference correlation matrix scaled by a first model fitting parameter and a noise correlation matrix scaled by a second model fitting parameter, and wherein elements of the interference correlation in the model are determined from channel estimates corresponding to one or more received signals of interest.

10. The method of claim 9, wherein measuring the received signal impairment correlations comprises measuring impairment correlations from the channel estimates, and wherein adapting the model fitting parameters comprises computing a plurality of channel estimates over each one of repeating time slots and calculating updated model fitting parameters for each slot based on the measured impairment correlations.

11. The method of claim 10, wherein measuring impairment correlations from the channel estimates includes varying a channel estimate across each slot such that measurements of the impairment correlations taken across the slot reflect changing fading conditions.

12. The method of claim 11, wherein varying a channel estimate across each slot comprises interpolating channel measurements across the slot such that a channel estimate value is a function of relative positioning within the slot.

13. The method of claim 12, wherein, for processing received Wideband Code Division Multiple Access (WCDMA) signals, interpolating channel estimates is based on a first number of pilot symbols received per slot for non-transmit diversity reception, and is based on a second number of pilot symbols received per slot for transmit diversity reception.

14. The method of claim 10, wherein calculating updated model fitting parameters comprises calculating the second model fitting parameter for each time slot by summing selected diagonal elements of a measured impairment correlation matrix obtained by measuring impairment correlations for a received signal, and subtracting components from the summed diagonal elements to obtain an estimate of noise power.

15. The method of claim 14, wherein summing selected diagonal elements of a measured impairment correlation matrix obtained by measuring the impairment correlations, and subtracting components from the summed diagonal elements to obtain an estimate of noise power comprises summing main diagonal elements corresponding to on-path RAKE fingers and subtracting a second value determined by summing main diagonal elements corresponding to off-path RAKE fingers.

16. The method of claim 14, wherein calculating updated model fitting parameters comprises calculating the first model fitting parameter for each time slot by summing differences between the measured impairment correlations and modeled impairment correlations as scaled by a function of the second model fitting parameter.

17. The method of claim 16, wherein summing differences between the measured impairment correlations and modeled impairment correlations as scaled by a function of the second model fitting parameter comprises summing differences between diagonal elements of a measured impairment correlation matrix and a modeled impairment correlation matrix included in the model.

18. The method of claim 16, further comprising setting a scaling of the second model fitting parameter to emphasize modeled noise components.

19. The method of claim 10, wherein calculating updated model fitting parameters for each slot based on the measured impairment correlations comprises performing a least squares fit of the model fitting parameters to make the weighted sum of modeled interference and noise correlation matrices substantially match the measured impairment correlations.

20. The method of claim 1, further comprising maintaining different state values for one or more of the model fitting parameters, so that scaling of the corresponding impairment terms is state dependent.

21. The method of claim 20, wherein the model includes an interference impairment term scaled by a first model fitting parameter, and wherein a received signal being processed comprises a Wideband Code Division Multiple Access (WCDMA) signal transmitted from a WCDMA base station having a first state wherein it actively transmits a High Speed Downlink Shared Channel (HS-DSCH) signal, and an inactive state wherein it does not actively transmit the HS-DSCH signal, and wherein maintaining different state values for one or more of the model fitting parameters comprises maintaining first and second state values for the first model fitting parameter corresponding to the active and inactive states of the HS-DSCH signal.

22. The method of claim 21, further comprising selecting one of the state values for the first model fitting parameter based on one of receiving control information from the base station, or blindly estimating the base station state.

23. The method of claim 1, wherein the model models the received signal impairment correlations as a first interference covariance matrix scaled by a first model fitting parameter, a second interference covariance matrix scaled by a second model fitting parameter, and a noise covariance matrix scaled by a third model fitting parameter.

24. The method of claim 23, further comprising providing a first model for a first received signal of interest, and providing a second model for a second received signal of interest, and wherein the first and second received signals of interest include soft handoff traffic signals transmitted from first and second base station transmitters, respectively, and further comprising using the first and second fitting parameters from the first model as the second and first fitting parameters, respectively, in the second model.

25. The method of claim 1, wherein the model maintains one of a combined model for two or more received signals of interest, and a separate model for each of two or more received signals of interest.

26. The method of claim 1, further comprising using modeled signal impairment correlations from the model to generate at least one of RAKE combining weights for RAKE combining despread values of a received signal corresponding to the model, or generating signal quality estimates for the received signal.

27. The method of claim 1, wherein measuring the received signal impairment correlations comprises estimating the received signal impairment correlations at successive instants in time based on interpolated channel estimates and adjusting the impairment correlations being modeled for spreading factor differences between received pilot signals and one or more received signals of interest.

28. The method of claim 1, wherein the model comprises a combined model corresponding to impairment correlations associated with two or more transmit diversity signals received as signals of interest.

29. The method of claim 28, wherein the combined model includes impairment correlation measurements for each received signal of interest in a combined impairment correlation matrix, and solves for model fitting parameters associated with each signal of interest.

30. The method of claim 1, wherein adapting each of the model fitting parameters comprises updating the impairment terms of the model at successive time instants based on current channel estimates and path delays for a received signal of interest, and calculating updated model fitting parameters to fit the updated impairment terms to currently measured received signal impairments.

31. The method of claim 30, wherein the model includes an interference impairment term comprising an interference covariance matrix that is updated at each time instant based on current channel estimates, current RAKE finger delay assignments, and current received signal path delays.

32. The method of claim 31, wherein the model further includes a noise impairment term comprising a noise covariance matrix that is updated over one or more time instants based on an autocorrelation function of a received signal filter pulse and on current RAKE finger delay assignments.

33. The method of claim 1, wherein the model maintains a model term for each of one or more received signals of interest.

34. The method of claim 1, wherein the model calculates at least one of the one or more impairment terms based on cross antenna values.

35. A computer readable medium storing a computer program for determining received signal impairment correlations using a model for impairment correlations comprising one or more model impairment terms scaled by corresponding model fitting parameters, the computer program comprising:
program instructions to compute the one or more model impairment terms;
program instructions to measure received signal impairment correlations;
program instructions to adapt each of the model fitting parameters using a fitting process to fit the modeled impairment terms, as scaled by the model fitting parameters, to the measured received signal impairment correlations; and
program instructions to calculate the modeled impairment correlations based on the adapted model fitting parameters.

36. A receiver circuit to determine received signal impairment correlations for use in received signal processing, the circuit comprising:
an impairment correlation estimator configured to measure received signal impairment correlations for a received signal of interest; and
one or more impairment modeling circuits configured to compute one or more model impairment terms, implement a model for impairment correlations comprising one or more model impairment terms scaled by corresponding model fitting parameters, adapt each of the model fitting parameters using a fitting process to fit the modeled impairment terms, as scaled by the model fitting parameters, to the measured received signal impairment correlations, and to calculate the modeled impairment correlations based on the adapted model fitting parameters.

37. The receiver circuit of claim 36, wherein the receiver circuit further comprises a RAKE combining weight generator configured to generate RAKE combining weights for RAKE combining despread samples of the received signal of interest based at least in part on the model of received signal impairment correlations.

38. The receiver circuit of claim 36, wherein the receiver circuit further comprises a Signal-to-Interference Ratio (SIR) estimation circuit configured to estimate a SIR for the received signal of interest based at least in part on the model of received signal impairment correlations.

39. A wireless communication terminal for use in a wireless communication network comprising:
a radio front-end circuit configured to provide one or more received signals of interest corresponding to one or more antenna-received signals; and
a receiver circuit configured to generate one or more RAKE combined signals by RAKE processing the one or more received signals of interest;
said receiver circuit configured to calculate RAKE combining weights by:
providing a model of received signal impairment for a received signal of interest comprising an interference impairment term scaled by a first fitting parameter and a noise impairment term scaled by a second fitting parameter; and
measuring received signal impairment correlations at each of one or more successive time instants and, at each time instant, adapting values of the first and second fitting parameters to fit the model to measured received signal impairment correlations.

40. The terminal of claim 39, wherein the receiver circuit is configured to update the model at each time instant based on current channel estimates and path delays for a received signal of interest such that instantaneous values of the first and second fitting parameters are calculated to fit current interference impairment and noise impairment terms to the measured received signal impairment correlations.

41. The terminal of claim 40, wherein the receiver circuit is configured to fit the model to the measured received signal impairment correlations by adapting the instantaneous values of the first and second fitting parameters comprises fitting the current interference impairment and noise impairment terms to the measured received signal impairment correlations using a Least Squares Estimation (LSE) process.

42. The terminal of claim 40, wherein the interference impairment term comprises an interference covariance matrix that is updated at each time instant based on current channel estimates, current RAKE finger delay assignments, and current received signal path delays.

43. The terminal of claim 40, wherein the noise impairment term comprises a noise covariance matrix that is updated over one or more time instants based on an autocorrelation function of a received signal filter pulse and on current RAKE finger delay assignments.

44. The terminal of claim 39, wherein the receiver circuit is configured to model the received signal impairment correlations as an interference covariance matrix scaled by the first fitting parameter and a noise covariance matrix scaled by the second fitting parameter.

45. The terminal of claim 39, wherein the receiver circuit is configured to initialize the model by setting the first fitting parameter to zero and setting the second fitting parameter to a positive value.

46. The terminal of claim 45, wherein the receiver circuit sets the second fitting parameter to a positive value by setting it to an estimate of received noise power.

47. The terminal of claim 39, wherein the receiver circuit is configured to provide a model for each of one or more transmitted signals of interest.

48. The terminal of claim 47, wherein despread values are obtained corresponding to respective ones of each of two or more transmit antennas, and wherein the receiver circuit is configured to provide a model term for sets of despread values corresponding to each transmit antenna.

49. The terminal of claim 39, wherein the terminal comprises a Wideband CDMA (WCDMA) terminal configured to receive signals from a WCDMA base station, and wherein the receiver circuit is configured to maintain a first value of the first fitting parameter corresponding to an active state of shared downlink channel transmission by the WCDMA base station, and a second value of the first fitting parameter corresponding to an inactive state of shared downlink channel transmission by the WCDMA base station.

50. The terminal of claim 39, wherein the receiver circuit is configured to maintain multiple values of one or both the first and second fitting parameter corresponding to different transmission conditions at one or more radio base stations transmitting signals received by the terminal.

51. The terminal of claim 39, wherein the receiver circuit is configured to calculate signal-to-interference ratios (SIRs) based on the model.

52. The terminal of claim 39, wherein the receiver circuit is configured to adapt values of the first and second fitting parameters to fit the model to measured received signal impairment correlations based on estimating the second fitting parameter as a noise power value, and computing the first model fitting parameter based on removing a noise term from the measured received signal impairment correlations as a function of the calculated second fitting parameter.

53. The terminal of claim 52, wherein removing a noise term from the measured received signal impairment correlations as a function of the calculated second fitting parameter comprises applying a mapping function to the second fitting parameter to give the noise power a desired weighting, and subtracting the weighted noise power from the measured received signal impairment correlations.

54. The terminal of claim 39, wherein each successive time instant comprises a defined time slot, and wherein the receiver circuit is configured to measure received signal impairment correlations for each slot based on determining differences between each of a plurality of despread values generated over the slot and a channel estimate that varies over the slot to reflect changing fading conditions.

55. The terminal of claim 39, wherein the receiver circuit is configured to adapt values of the first and second fitting parameters to fit the model to measured received signal impairment correlations based on least squares fitting the model to the measured received signal impairment correlations.

56. A method of received signal processing comprising:
receiving one or more signals of interest during each of a succession of time slots;
generating channel estimates over each time slot;
measuring impairment correlations for the one or more signals of interest;
computing one or more model impairment terms;
updating model fitting parameters used to scale the one or more model impairment terms to fit modeled impairment correlations derived from the scaled model impairment terms to the measured impairment correlations; and
based on the updated model fitting parameters, generating in each time slot at least one of RAKE combining weights for combining despread values for the one or more signals of interest, and signal quality measurements for the one or more signals of interest.

57. The method of claim 56, wherein updating the model fitting parameters comprises updating a first scaling factor used to scale an interference impairment term and updating a second scaling factor used to scale a noise impairment term.

58. The method of claim 57, wherein updating the first scaling factor and updating the second scaling factor comprises calculating the second scaling factor by estimating a noise power, and calculating the first scaling factor by removing values using the second scaling factor from elements in a measured impairment correlation matrix representing the measured impairment correlations.

59. The method of claim 58, wherein calculating the first scaling factor by removing values using the second scaling factor from elements in a measured impairment correlation matrix representing the measured impairment correlations comprises generating the values from the second scaling factor based on a desired weighting emphasis to noise power.

* * * * *

UNITED STATES PATENT AND TRADEMARK OFFICE
CERTIFICATE OF CORRECTION

PATENT NO.       : 7,539,240 B2
APPLICATION NO.  : 10/800167
DATED            : May 26, 2009
INVENTOR(S)      : Cairns et al.

It is certified that error appears in the above-identified patent and that said Letters Patent is hereby corrected as shown below:

On the Title Page, in Field (73), under "Assignee", in Column 1, Line 1, delete "Telefonaftiebolaget" and insert -- Telefonaktiebolaget --, therefor.

In Column 5, Line 15, in Equation (4), delete " $\hat{R}(slot) =$ " and insert -- $\hat{R}(slot) \approx$ --, therefor.

In Column 8, Line 6, in Equation (17), delete "$z = w^H$." and insert -- $z = w^H y.$ --, therefor.

In Column 15, Line 24, in Equation (30), delete " $z_1 = e_A^H y_1 + (w_B^H y_2)^*$ " and insert -- $z_1 = w_A^H y_1 + (w_B^H y_2)^*$ --, therefor.

In Column 16, Line 64, in Equation (36), delete " $\hat{R}_{12} =$ " and insert -- $\hat{R}_{12}$ --, therefor.

In Column 19, Line 7, delete "processor," and insert -- processor 16, --, therefor.

In Column 19, Line 54, in Claim 5, delete "WCMDA" and insert -- WCDMA --, therefor.

Signed and Sealed this

Twenty-fourth Day of November, 2009

David J. Kappos
*Director of the United States Patent and Trademark Office*